May 20, 1952 D. W. KELBEL 2,597,245
TRANSMISSION AND CONTROL MECHANISM THEREFOR
Filed Nov. 23, 1945 4 Sheets-Sheet 1

Fig. 1

Inventor:
Donald W. Kelbel
By Edward C. Fritzlaugh
Atty.

May 20, 1952  D. W. KELBEL  2,597,245
TRANSMISSION AND CONTROL MECHANISM THEREFOR
Filed Nov. 23, 1945  4 Sheets-Sheet 3

Inventor:
Donald W. Kelbel

Patented May 20, 1952

2,597,245

UNITED STATES PATENT OFFICE 2,597,245

TRANSMISSION AND CONTROL MECHANISM THEREFOR

Donald W. Kelbel, Muncie, Ind., assignor to Borg-Warner Corporation, Chicago, Ill., a corporation of Illinois Application November 23, 1945, Serial No. 630,308

15 Claims. (Cl. 74—765)

My invention relates to transmissions and control mechanisms therefor and more specifically to such transmissions and control mechanisms which are particularly useful in automotive vehicles.

It is an object of my invention to provide an improved transmission which comprises planetary gearing and two friction clutches for connecting the planetary gearing to the drive shaft of the transmission. More particularly it is an object to provide two such clutches one of which is fluid pressure operated and the other of which is fluid pressure controlled for conditioning the clutch to be centrifugally engaged according to the speed of the drive shaft of the transmission.

It is another object of the invention to provide improved hydraulic controlling mechanism for a transmission, and to this end it is an object of the invention to provide a multi-position valve which is power operated and which controls a transmission to shift it into different speed ratios as the valve is moved into different positions. It is a more specific object to provide such a valve which is moved between its various positions by means of a vacuum motor and which is yieldably held in any one of its various positions by selectively controllable latching means, the latching means preferably being electrically controlled and constituting electric solenoids having movable plungers therein for engaging the valve.

It is still another object of the invention to provide improved hydraulic controlling mechanism for a transmission by means of which the driven shaft of the transmission may be utilized for starting the engine of the vehicle, with fluid pressure being provided by a pump driven by the driven shaft of the transmission for completing a power train from the driven shaft to the drive shaft. In accordance with this object, it is a further object to provide valve mechanism connected with the driven shaft pump which connects the pump with an oil supply tank of the transmission disposed beneath the gearing of the transmission when the pump is utilized for completing a power train from the driven shaft to the drive shaft and for otherwise connecting the pump when the engine is operative to an oil sump beneath fluid pressure operated clutch mechanism of the transmission for maintaining the sump drained of fluid.

The invention consists of the novel constructions, arrangements and devices to be hereinafter described and claimed for carrying out the above stated objects and such other objects as will appear from the following description of a certain preferred embodiment illustrated in the accompanying drawings, wherein:

Like characters of reference designate like parts in the several views.

Figure 1:
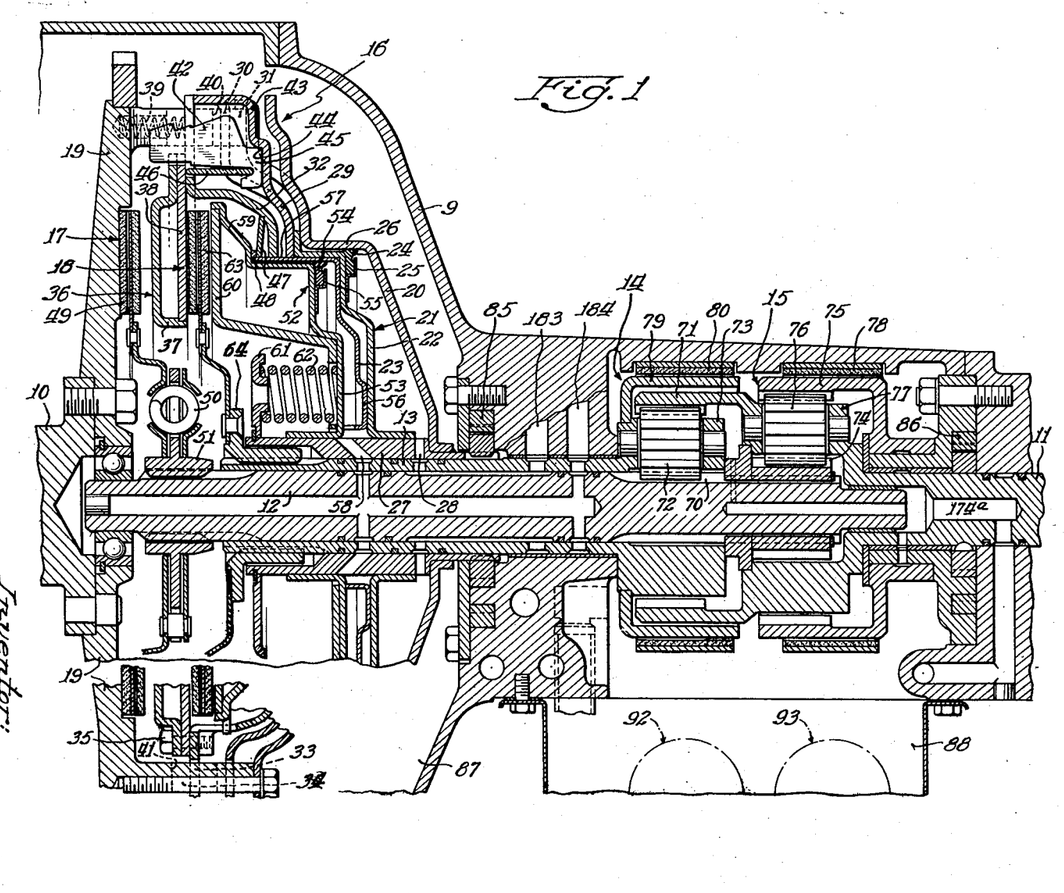
Fig. 1 is a longitudinal sectional view of a transmission embodying principles of the invention.

Referring now to the drawing and in particular to Fig. 1 thereof, the transmission illustrated comprises a transmission casing 9 and a drive shaft 10 and a driven shaft 11 extending into the casing. The drive shaft 10 is adapted to be connected to the engine (not shown) of an automotive vehicle, and the driven shaft 11 is adapted to be connected with the driving wheels (not shown) of the vehicle. An intermediate shaft 12 is piloted in the shafts 10 and 11, and a second intermediate shaft 13 is rotatably disposed on the shaft 12. The transmission comprises two planetary gear sets 14 and 15 and fluid pressure operated and controlled clutch mechanism 16 for connecting various elements of the planetary gear sets with the drive shaft 10.

The clutch assembly 16 comprises two friction clutches 17 and 18, the clutch 17 being utilized for connecting the drive shaft 10 with the intermediate shaft 12 and the clutch 18 being utilized for connecting the drive shaft 10 with the intermediate shaft 13. The assembly comprises a flywheel 19 fixed to the shaft 10 to rotate therewith and a rear coverplate 20 which is bolted to the flywheel 19. A piston 21 comprising annular sheet metal parts 22 and 23 and also a piston ring 24, held by a retainer ring 25 with respect to the part 22, is provided within the cover plate. The piston 21 is disposed between a cylindrical portion 26 formed in the cover plate 20 and a sleeve 27 disposed on the shaft 13 and fixed with respect to the cover plate 20. A fluid conduit 28 passing through the shafts 12 and 13 and the sleeve 27 is provided to supply fluid from any suitable source to the rear of the piston 21 and between the piston and cover plate 20 to force the piston forwardly of the clutch assembly. The piston 21 acts by means of its member 22 on an annular sheet metal member 29 disposed about the member 23. The member 29 has a plurality of lug portions 30 each of which passes through a slot 31 provided in the side of the flywheel 19 and the arrangement is such that the member 29 may move longitudinally with respect to the clutch assembly. The member 29 bears on the outer edge of an annular sheet metal member 32 which is provided with lug portions 33 passing through appropriate slots 34 provided in the side of the flywheel 19 whereby the member 32 may also move longitudinally of the clutch assembly. The member 32 is disposed about the member 23 of the piston 21 and has fixed thereto, by means of screws 35, a pressure plate 36 formed by sheet metal members 37 and 38. A plurality of springs 39 are provided in suitable cavities in the side of the flywheel 19 and act on the member 32 for yieldably holding the members 32, 29 and the piston 21 at the rearward limit of movement of these parts with the member 22 of the piston bearing against the cover plate 20 as shown. Each of the slots 31 has a bottom 40 which functions to limit the movement of the member 29 toward the front of the clutch assembly, and each of the slots 34 is provided with a bottom 41 which functions to limit the movement in the same direction of the sheet metal member 32. The parts of the clutch assembly so far described function so that when fluid under pressure is admitted behind the piston 21; the piston, the parts 29 and 32 and the pressure plate 36 are moved forwardly until the lugs 30 contact the bottoms 40 of the slots 31.

The clutch 17, after fluid under pressure has been applied to the piston 21 to move the lug portions 30 of the member 29 into contact with the bottoms 40 of the slots 31, is conditioned to be engaged according to the speed of the shaft 10. Centrifugal weights 42 perform this function of centrifugally engaging the clutch. The member 29 is provided with outwardly extending wing or lug portions 43, and each of these portions is provided with a notch 44 in which is received an acute portion 45 of a weight 42, the arrangement being such that the notch 44 acts as a fulcrum for the weight, allowing the weight to move outwardly under the influence of centrifugal force due to rotation of the shaft 10, and flywheel 19, the member 29 and thereby the weight 42. Each of the weights is connected by means of a strut 46 with the pressure plate 36, so that as the weights 42 move outwardly, the weights tend to separate the members 29 and 32 and move the pressure plate 36 toward the flywheel 19. A washer type spring 47 is disposed between the member 32 and a flange 48 on the end of the member 23, and the spring 47 is so disposed as to yieldingly oppose such forward movement of the pressure plate 36 due to outward movement of the weights 42, and as will be apparent, such movement of the pressure plate 36 is also similarly opposed by the springs 39. The clutch 17 comprises in addition to the flywheel 19 and the pressure plate 36, the driven plate 49 which is connected by means of a vibration absorbing unit 50 of any suitable construction with a hub 51 which is splined to the shaft 12. The weights 42 function, after fluid under pressure has been applied to the piston 21 to move the piston and the associated parts so that the member 29 contacts the bottoms 40 of the slots 31 for conditioning the clutch 17 for engagement, to move the pressure plate 36 the additional distance needed to engage the clutch 17.

A piston 52 is provided for engaging the clutch 18. This piston comprises a member 53 of sheet metal, a piston ring 54 of yielding material, and a sheet metal retainer member 55. The member 55 holds the ring 54 in place with respect to the member 53, as shown. The pistons 21 and 52 are held apart by means of a perforated flange 56 provided on the member 23. The piston 52 is disposed between and is movable with respect to a cylindrical portion 57 of the member 23 and the sleeve 27. A fluid conduit 58 extending through the sleeve 27 and the shafts 12 and 13 is provided for supplying fluid under pressure from any suitable source to the rear of the piston 52. A pressure plate 59 movable by the piston 52 is formed by the member 53 and an annular member 60 as shown. The sleeve 27 has an annular member 61 fixed thereon against forward movement, and springs 62 are provided between the member 53 and the member 61. These springs function to yieldingly oppose movement of the piston 52 forwardly, and the springs together with the springs 39 function also to oppose forward movement of the piston 21 and its associated parts. The clutch 18, comprises, in addition to the pressure plate 36 and the pressure plate 59, a driven clutch disc 63. The disc 63 has a hub 64 that is splined to the shaft 13 so as to be nonrotatable with respect to the shaft, but the hub may have longitudinal movement on the shaft. The clutch 18 is engaged by applying fluid under pressure behind the piston 52 through the conduit 58 to move the piston and thereby the pressure plate 59 forwardly whereby the disc 63 is engaged between the pressure plates 59 and 36, and this engagement may take place either with the clutch 17 engaged or disengaged.

The planetary gear set 14 comprises a sun gear 70 formed on the shaft 12, a ring gear 71, a plurality of planet gears 72 in mesh with the sun gear 70 and ring gear 71 and a planet gear carrier 73 which is formed integral with the shaft 13. The planetary gear set 15 comprises a sun gear 74, a ring gear 75 and a plurality of planet gears 76 in mesh with the sun and ring gears, and a planet gear carrier 77. The ring gear 71 and the planet gear carrier 77 are formed integral with the driven shaft 11, and the sun gear 74 is splined to the shaft 12, as shown. The ring gear 75 is in the form of a brake drum, and a brake 78 is provided for gripping this drum and preventing any rotation thereof. The planet gear carrier 73 is provided with a brake drum 79, and a brake 80 is provided for gripping this drum and preventing rotation of the gear carrier 73.

The illustrated transmission provides three speeds in forward drive and also a reverse drive power train. The brake 78 and the clutch 17 are engaged to provide a low speed forward drive, and the power train is from the flywheel 19 through the clutch 17 and shaft 12 to the planet gear set 15 and thence to the driven shaft 11. The brake 78 is retained in engagement for second or intermediate speed forward drive and the clutch 17 is disengaged and the clutch 18 is engaged. The power train in intermediate drive is from the flywheel 19 through the clutch assembly 16 and the clutch 18 to the intermediate shaft 13 and thence through the two planet gear sets 14 and 15 to the driven shaft 11. The rotation of the sun gear 70, which is not clutch engaged at this time, rotates the sun gear 74 which reacts on gear 75 through the carrier 77 and causes rotation of the carrier 77. The two clutches 17 and 18 are both engaged for direct drive and the brake 78 is disengaged. The power train in this drive is from the flywheel 19 through the clutch assembly 16 and through the shafts 12 and 13 to the planet gear sets 14 and 15 to the driven shaft 11. Both of the planetary gear sets 14 and 15, as will be readily understood, are locked up in direct drive and there is no relative movement between the parts of either planetary gear set in this drive. For reverse drive, the brake 80 is applied to hold the planetary gear carrier 73 stationary, and the clutch 17 is applied to drive the shaft 12. The power train in this drive is from the flywheel 19, through the clutch 17 and the shaft 12, and through the planetary gear set 14 to the driven shaft 11.

Figure 2:
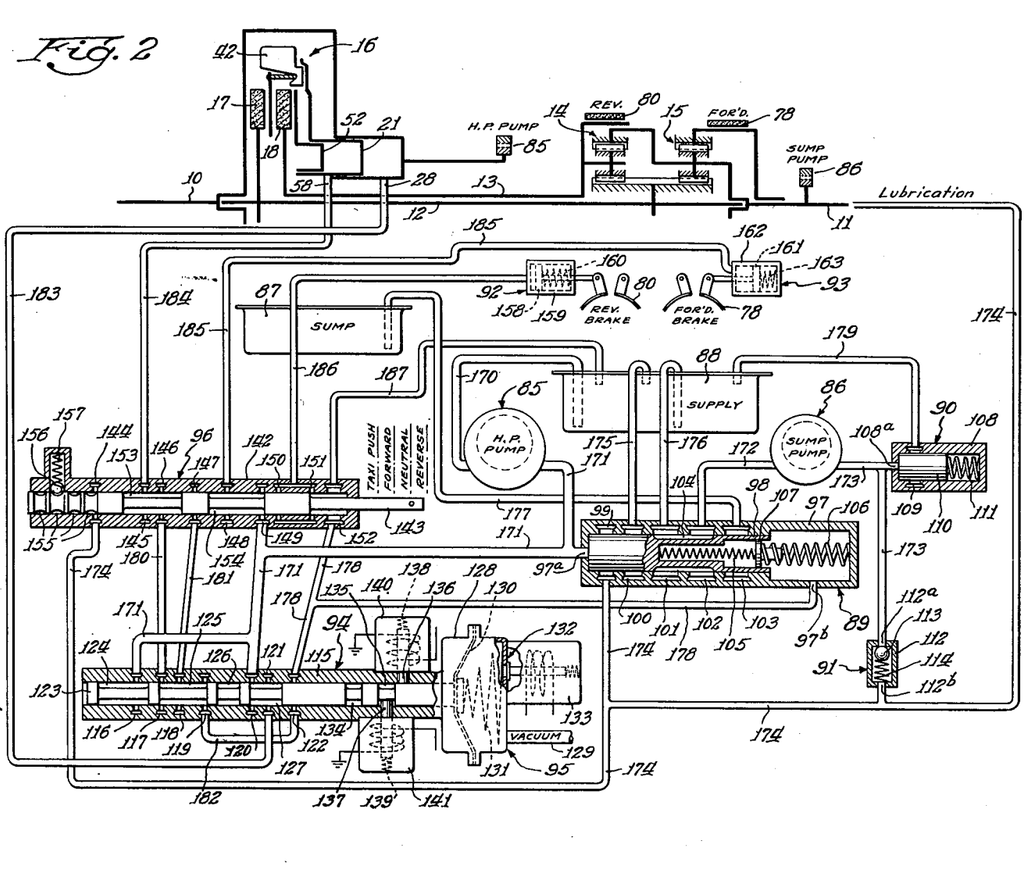
Fig. 2 is a schematic illustration of fluid pressure controlling mechanism for the transmission shown in Fig 1 with the mechanism being conditioned to provide a neutral condition of the transmission and with both drive and driven shafts being stationary.

Referring now in particular to Fig. 2 of the drawings, the control mechanism for the transmission above described comprises in general a high pressure pump 85, a sump pump 83, an oil sump 87, an oil supply tank 88, a high pressure relief valve 89, a low pressure relief valve 90, a check valve 91, a motor 92 for the reverse brake 80, a motor 93 for the forward brake 78, a ratio selector valve 94, a vacuum motor 95 for actuating the ratio valve, and a forward and reverse valve 96.

The oil sump 87 is formed by the transmission casing 9 directly below the clutch assembly 16, and this oil container functions to collect any oil that may leak from the clutch assembly. This sump is normally kept drained by means of the sump pump as will be described. The oil supply tank 88 is also formed by means of the transmission casing 9 and is disposed immediately beneath the planetary gear sets 14 and 15. This supply tank 88 constitutes the main source of oil supply for controlling the transmission as well as for lubricating the transmission. The high pressure pump 85 is disposed in the transmission immediately behind the clutch assembly 16 and is driven by the sleeve 27 and the cover 28 (see Fig. 1). The sump pump 86 is disposed behind the planetary gear set 15 and is splined to the driven shaft 11 so as to be driven thereby. Both of the pumps 85 and 86 may be of any suitable construction, such as the gear type which is illustrated.

The high pressure relief valve 89 comprises a valve casing 97 in which a valve piston 98 is slidably disposed. The casing 97 is provided with grooves 99, 100, 101, 102 and 103 formed in its inner surface, and the piston is formed with a groove 104 in its outer surface. Springs 105 and 106 are provided for acting on the piston 98. The spring 105 is of lighter weight than the spring 106, and there is a plunger 107 disposed between the springs.

The low pressure relief valve 90 comprises a valve casing 108 having a groove 109 formed in its inner surface. A valve piston 110 is slidably disposed in the casing 108 and is acted on by a spring 111. The check valve 91 comprises an outer casing 112 having a ball 113 slidably disposed therein and acted upon by a spring 114.

The ratio selector valve 94 comprises an outer valve casing 115 having grooves 116, 117, 118, 119, 120, 121 and 122 formed in its inner surface and a valve piston 123 having grooves 124, 125, 126 and 127 therein slidably disposed within the casing 115. The vacuum motor 95 comprises a casing 128 in which a partial vacuum is produced by means of a vacuum line 129 connected therewith. The vacuum line 129 may be connected with the manifold of the vehicle engine (not shown) or with any other suitable source of vacuum. The motor 95 includes a diaphragm 130 connected with the piston 123, and a spring 131 is provided for acting on the piston 123 to yieldingly maintain the piston in the position in which it is shown in Fig. 2. A valve 132 is provided for connecting the interior of the casing 128 to the outside atmosphere as desired for selectively decreasing the vacuum applied to the diaphragm 130, and this valve is controlled by means of an electric solenoid 133. The piston 123 is provided with two grooves 134 and 135 therein and plungers 136 and 137 are provided for cooperating with the grooves for yieldingly latching the valve piston 123 in any one of three different positions, as will be hereinafter described. The plungers 136 and 137 are acted upon by springs 138 and 139 respectively, and the plungers are moved outwardly with respect to the valve piston 123 against the action of the springs by means of electric solenoids 140 and 141 respectively.

The forward and reverse valve 96 comprises a valve casing 142 and a valve piston 143 slidably disposed therein. The valve casing 142 is provided with internal grooves 144, 145, 146, 147, 148, 149, 150, 151 and 152, and valve piston 143 is provided with grooves 153 and 154 which cooperate with the grooves in the valve casing. Ball and detent means are provided for holding the valve piston 143 in a plurality of different positions, namely in a taxi-push, a forward, a neutral, or in a reverse position. This ball and detent means comprises four grooves 155, each corresponding to one of the different positions of the valve piston named above and a ball 156 acted on by a spring 157 adapted to fit in any of the grooves 155.

The motor or actuator 92 for the reverse brake 80 comprises a piston 158 slidably disposed in a casing 159 and acted on by a spring 160. The spring 160 is so disposed in the casing as to yieldingly hold the reverse brake in a disengaged condition. The motor or actuator 93 for the forward brake comprises a piston 161 slidably disposed in a casing 162 and acted on by a spring 163. The spring 163 is so disposed with respect to the piston 161 as to yieldingly hold the forward brake in engaged condition, and the spring 163 thus acts in a manner opposite to that of the spring 160 in the motor 92.

The fluid connections between the various parts of the control mechanism for the transmission will now be described. The high pressure pump 85 has its input side connected by means of a conduit 170 with the oil supply tank 88 and has its output side connected by means of conduits 171 with an opening 97a in the casing 97 of the high pressure relief valve 89, the groove 149 in the forward and reverse valve 96 and the grooves 120 and 116 in the ratio selector valve 94. Under normal running conditions, the conduits 171 thus constitute oil pressure supply conduits, as will hereinafter be made apparent. The input side of the sump pump 86 is connected by means of a conduit 172 with the groove 102 in the valve 89, and the sump pump at its output side is connected by means of conduits 173 with an opening 108a in the casing 108 of the valve 90 and with an opening 112a in the check valve 91.

The groove 99 in the casing 97 of the high pressure relief valve is connected by conduits 174 with the groove 144 in the forward and reverse valve 96, with an opening 112b in the check valve 91 and with a conduit 174a (see Fig. 1) in the shaft 11 which supplies oil to the planet gear sets 14 and 15 for lubricating the gears thereof. The conduit 174 thus constitutes a lubricating conduit, and, as will be hereinafter described, also a conduit for providing a taxi-push or a drive from the driven shaft to the drive shaft when the vehicle motor is inoperative. The groove 100 in the high pressure relief valve 89 is connected by means of a conduit 175 with the oil supply tank 88, and this conduit is a bleed or discharge conduit. The groove 101 in the casing 97 is connected by means of a conduit 176 with the supply tank 88, and this conduit is an inlet conduit. The groove 103 in the valve 89 is connected by means of a conduit 177 with the sump 87, and this conduit constitutes a bleed conduit. The casing 97 is provided with an opening 97b therein, and the casing by means of this opening and conduits 178 is connected with the grooves 152 in the forward and reverse valve 96 and with the grooves 122 in the ratio selector valve 94. The conduits 178 constitute bleed conduits, as will be hereinafter more fully described. The groove 109 in the casing 108 of the low pressure relief valve 90 is connected by means of a conduit 179 with the oil supply tank 88, and this conduit constitutes a bleed conduit as will be more fully described.

The groove 117 in the ratio selector valve 94 is connected by means of a conduit 180 with the groove 146 in the forward and reverse valve 96, and the groove 118 in the valve 94 is connected by means of a conduit 181 with a groove 147 in the casing 142. The groove 119 in the valve 94 is connected by means of a conduit 182 with the groove 122 in this valve. The groove 121 in the valve 94 is connected to a conduit 183 and thereby with the passages 28 (see Fig. 1) supplying fluid under pressure to the clutch piston 21.

The groove 145 in the casing 142 of the forward and reverse valve 96 is connected by means of a conduit 184 with the passages 58 (see Fig. 1) for applying fluid under pressure to the piston 52 in the clutch assembly 16. The groove 148 in the valve 96 is connected by means of a conduit 185 with the forward brake actuator 93, so as to apply fluid under pressure to the piston 161 for moving the piston against the action of the spring 163. The grooves 150 and 151 in the valve 96 are connected together as shown and are connected by means of a conduit 186 with the reverse brake actuator motor 92 in such a manner as to apply fluid pressure to the piston 158 in this motor to move the piston against the action of the spring 160. The groove 152 in the valve 96 is connected with the conduit 178 as has been described, and this groove is also connected by means of a conduit 187 with the oil supply tank 88, the conduit 187 constituting a bleed conduit, as will be hereinafter more fully described.

The operation of the transmission controlling mechanism is as follows:

In Fig. 2 the transmission controlling mechanism is shown in neutral condition. The forward and reverse valve 96 has four different positions, namely, taxi-push for driving the drive shaft 10 from the driven shaft 11 while the engine is inoperative, forward position, reverse position and a neutral position, the valve piston 143 being shown in the latter position in this figure. The ball and detent means comprising the grooves 155 and the spring pressed ball 156 function to yieldingly maintain the valve piston 143 in any of its four positions. With both drive and driven shafts stationary and thereby with both the pumps 85 and 86 inoperative, the high pressure relief valve 89 and the low pressure relief valve 90 are in their conditions as shown. When the engine connected with the drive shaft 10 is started, the high pressure pump 85 driven by the shaft 10 is made operative and draws oil from the supply tank 88 through the conduit 170 and discharges the oil into the conduits 171. The conduits 171 thus constitute the primary source of oil pressure for operating the brakes and clutches of the transmission. The oil pressure in the conduits 171 is maintained at a certain high pressure such as, for example, 75 pounds per square inch, due to the action of the high pressure relief valve 89. Fluid pressure in the conduits 171 is exerted through the opening 97a in the casing 97 on the valve piston 98 and this pressure moves the piston to the right as seen in Fig. 2 against the action of the spring 105 until the piston contacts the plunger 107. Such movement of the valve piston 98 has the effect of forming a communication between the conduits 171 and the conduit 174, so that fluid is admitted to the latter conduit to lubricate the planetary gear sets 14 and 15. The fluid pressure causes further movement of the valve piston 98 to the right with the piston in contact with the plunger 107 and with such movement being against the action of the spring 106 to allow communication between the conduits 171 and 175, and the excess fluid discharged by the high pressure pump 85 flows through the conduit 175 and back into the oil supply tank 88. The spring 106 functions to maintain the fluid pressure in the conduits 171 at a high predetermined value, shutting the groove 100 when the pressure is less than that value and opening the groove 100 to the conduit 171 when the fluid pressure becomes greater than this value. In the neutral condition of the control mechanism, the sump pump 86 is not in operation, and there thus is no fluid under pressure in the conduits 173 and 179.

The groove 116 in the casing 115 of the ratio selector valve 94 is shut off by the groove 124 of the valve piston 123 from any of the other grooves in the casing 115, and pressure from the groove 116 thus has no effect. The groove 127 in the valve piston 123 allows communication between the grooves 120 and 121 in the casing 115 so that fluid under pressure flows from the conduit 171 through the groove 127 in the valve piston to the conduit 183 and thence to the piston 21 in the clutch mechanism 16. The low speed clutch 17 thus will be engaged when the engine and the drive shaft 10 are sufficiently increased in speed. The groove 154 in the valve piston 143 allows communication between the grooves 148 and 149 in the valve casing 142 of the forward and reverse valve 96, and fluid under pressure thus flows from the conduit 171 through the conduit 185 to the forward brake actuator 93. Fluid under pressure is thus exerted on the piston 161 forcing the piston to the right as seen in Fig. 2 against the action of the spring 163 to thereby release the forward brake. The forward brake being released, there can be no drive from the drive shaft to the driven shaft with the forward and reverse valve 96 being in neutral condition regardless of the speed to which the drive shaft 10 is increased. It will be noted that in neutral condition of the forward and reverse valve 96, the motor 92 for the reverse brake and the second speed ratio piston 52 are bled. The motor 92 is bled through the conduit 186, the passages 151, the passages 152 and the conduit 187 to the tank 88. The piston 52 is bled through the conduit 184, the passages 145 and 146 in communication due to the groove 153 in the valve piston 143, the conduit 180, the passages 117 and 119 in the valve 94 which are in communication due to the groove 125 in the valve piston 123, the conduit 182, the groove 122, the conduit 178, the groove 152, and the conduit 187.

Figure 3:
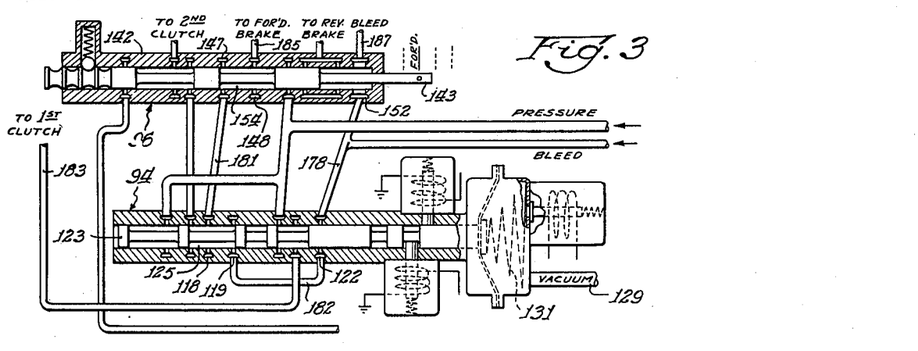
Fig. 3 is an illustration of a portion of the controlling mechanism shown in Fig. 2 but with the mechanism being conditioned to provide a first or low speed ratio through the transmission.

To condition the transmission for low speed forward drive, the valve piston 143 of the low and reverse valve 96 is moved to its "forward" position which is indicated in Fig. 2, so that the valves 96 and 94 are in the conditions in which they are shown in Fig. 3. The valve 94 still causes fluid under pressure to be applied to the piston 21 of the clutch mechanism 16 so that the clutch 17 may be engaged when the shaft 10 is increased in speed. The net result of moving the valve piston 143 is the connection by means of the groove 154 in the valve piston of the grooves 147 and 148 in the valve casing 142. The fluid in the conduit 185 and thereby in the actuator 93 for the forward brake is then drained through the grooves 148 and 147 in the casing 142 and the groove 154 in the piston 143, through the conduit 181 and thence through the grooves 118, 119 and 125, the conduit 182, the groove 122, the conduit 178, the groove 152 and the conduit 187 to the oil supply tank 88. This release of fluid under pressure on the piston 161 permits the spring 163 to be operative to engage the forward brake 78, and the transmission is then in condition for first speed forward drive.

Figure 4:
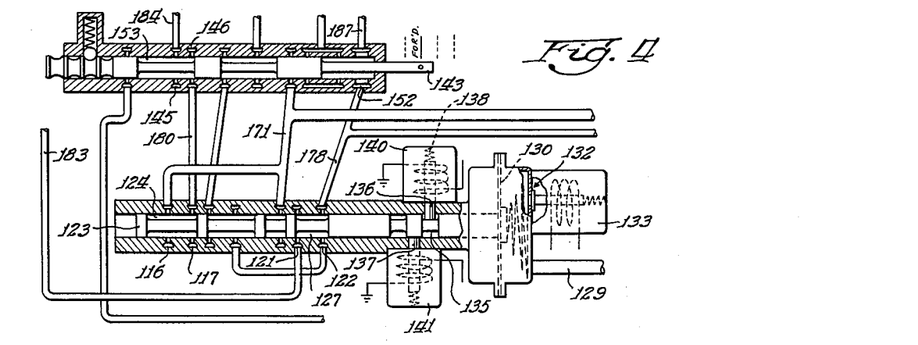
Fig. 4 is a schematic illustration similar to Fig. 3 but with the mechanism being conditioned to provide a second or intermediate ratio through the transmission.

To shift the transmission from low speed ratio to intermediate speed ratio in forward drive, the valve piston 123 is moved from the position in which it is shown in Figs. 2 and 3 to its Fig. 4 position. This is done by energizing the solenoid 141 to draw the plunger 137 out of the groove 135 in the valve piston while permitting vacuum to act on the diaphragm 130. The solenoid 133 is deenergized to render the valve 132 closed to allow the vacuum in the line 129 to be operative. The retraction of the plunger 137 with the vacuum exerted on the diaphragm 130 will allow movement of the valve piston 123 to the right to its next speed position in which it is shown in Fig. 4, and the plunger 136 drops into the groove 135 and acts as latching means for holding the piston 123 in its second speed position. The electric solenoid 140, of course, is deenergized to allow the spring 138 to be effective on the plunger 136. It is contemplated that the vacuum line 129 may be connected with the manifold of the engine used in connection with the transmission and that the upshift from first to second speed shall preferably be made when the accelerator for the engine is in released position so that the vacuum in the manifold and thus in the line 129 is at a maximum. It will be understood, however, that any other suitable source of vacuum may be used.

The valve piston 123 in its second speed position applies fluid under pressure to the piston 52 for the second speed clutch 18 and releases fluid pressure against the piston 21 for the first speed clutch 17, and the forward brake is continued in applied condition. The conduit 183 connected with the clutch piston 21 is bled through the grooves 121, 122 and 127, the conduit 178, the groove 152 and the conduit 187. Fluid pressure is applied to the second speed clutch piston 52 from the conduit 171 through the grooves 116, 117 and 124, the conduit 180, the grooves 145, 146 and 153 and the conduit 184. The forward brake actuator 93 is bled through the same grooves and passages as for first speed ratio.

Figure 5:
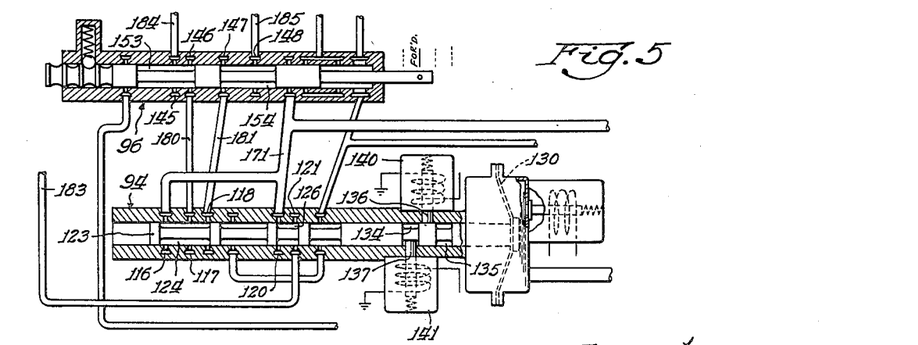
Fig. 5 is a schematic illustration similar to Fig. 3 but with the mechanism being conditioned to provide a third or direct speed ratio through the transmission.

To shift the transmission into third speed forward drive, the valve piston 123 is moved into its third speed position in which it is shown in Fig. 5. This is accomplished by energizing the solenoid 140 to pull the plunger 136 out of the groove 135 while the solenoid 141 is deenergized to permit the plunger 137 to enter the groove 134, the actual movement of the valve piston 123 being accomplished as will be understood by vacuum exerted on the diaphragm 130. In the condition of the valves 96 and 94 as shown in Fig. 5, both of the clutches 17 and 18 are engaged while the forward brake is disengaged. Fluid under pressure is applied to the first speed clutch piston 21 from the conduit 171 through the grooves 120, 121 and 126 and the conduit 183. Fluid under pressure is applied to the second speed clutch piston 52 from the conduit 171 through the grooves 116, 117 and 124, the conduit 180, the grooves 145, 146 and 153 and the conduit 184. Fluid under pressure is applied to the forward brake actuator 93 to release the brake from the conduit 171, the grooves 116, 118 and 124, the conduit 181, the grooves 147, 148 and 154 and the conduit 185.

The valve piston 123 may be down-shifted by energizing the solenoid 133 to open the valve 132 and to thereby relieve the vacuum applied to the diaphragm 130. One or both of the solenoids 140 and 141 are energized at the same time to thereby withdraw the respective plungers 136 and 137 out of position for engaging the grooves 134 and 135. The spring 131 will then move the valve piston 123 to the left as seen in the figures. If the solenoid 141 is energized with the solenoid 140 being deenergized, the valve piston will be shifted by the spring 131 from its third speed position to its second speed position, while if both of the solenoids 140 and 141 are deenergized, the valve piston will be shifted from its third speed position to its first speed position. When the valve piston is in its first speed position, the solenoid 141 may be again deenergized to allow its plunger to enter the groove 135 and yieldingly latch the valve piston into position. Such down-shifts from a higher speed ratio to a lower speed position of the valve 123 may also advantageously be made when the accelerator for the engine of the vehicle is fully depressed to fully open the throttle valve of the engine so that the vacuum in the vacuum line 129, with this line being connected to the engine manifold, is at a minimum, and in this case the valve 132 may be allowed to remain closed and the spring 131 will return the valve piston 123 to a lower speed position.

Figure 6:
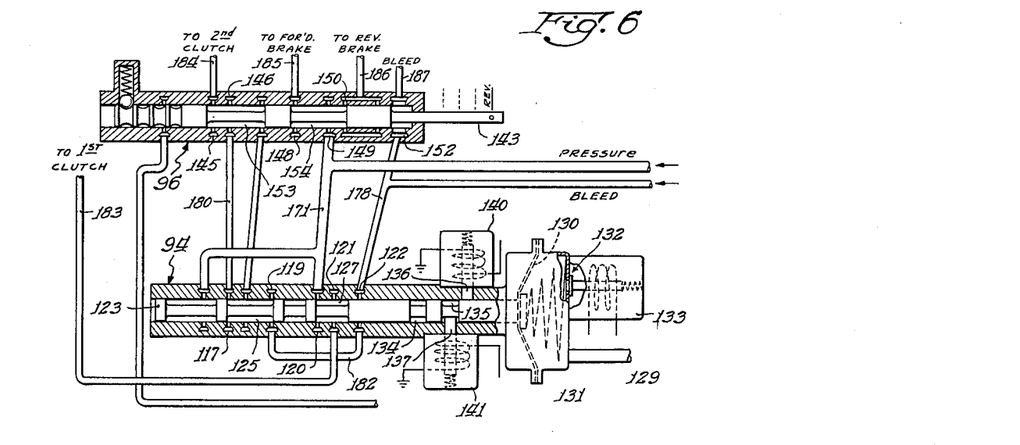
Fig. 6 is a view similar to Fig. 3 but with the mechanism being conditioned to provide a reverse drive through the transmission.

The transmission may be conditioned for reverse drive by shifting the forward and reverse valve piston 143 into its reverse position and shifting the valve piston 123 into its low speed position, these valves being shown in these positions in Fig. 6. With the valves 96 and 94 in their Fig. 6 positions, the motor 92 for the reverse brake 80 is energized to engage this brake, the motor 93 for the forward brake 78 is energized to release the forward brake and the piston 21 has fluid pressure applied thereto to condition the clutch 17 for engagement on the speed of the drive shaft 10 reaching a certain determined value. The reverse brake motor 92 has fluid pressure applied thereto from the conduits 171, and through the grooves 149, 150 and 154 in the forward and reverse valve 96 and the conduit 186. The forward brake actuator 93 has fluid pressure applied thereto from the conduit 171 through the grooves 149, 148 and 154 in the valve 96 and the conduit 185. The clutch piston 21 has fluid pressure applied thereto from the conduit 171 through the grooves 120, 121 and 127 in the valve 94 and the conduit 183. The clutch piston 52 is bled of fluid through the conduit 184, the grooves 145, 146 and 153 in the valve 96, the conduit 180, the grooves 117, 119 and 125 in the valve 94, the conduit 182, the groove 122, the conduit 178, the groove 152 and the conduit 187.

Figure 7:
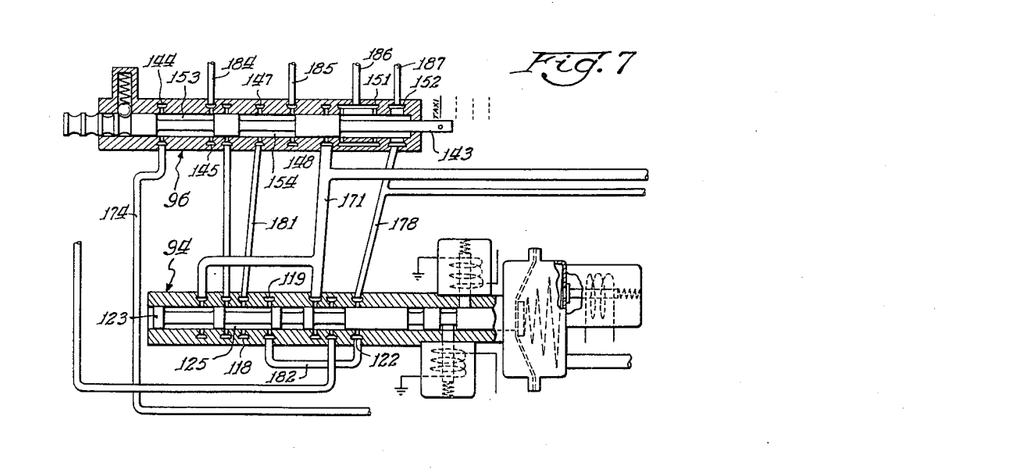
Fig. 7 is a view similar to Fig. 3 but with the mechanism being conditioned to provide a taxi-push drive through the transmission, that is, a drive wherein the driven shaft may be utilized for driving the drive shaft when the engine of the vehicle is inoperative.

In order to put the transmission in condition for taxi-push, that is in condition so that the engine of the vehicle may be started by driving the driven shaft 11, the valves 94 and 96 are put into the conditions in which they are shown in Fig. 7, that is, with the valve piston 143 in its taxi-push position and with the valve piston 123 in its low speed position. With the valves being in these conditions, fluid pressure will be applied to the second speed clutch piston 52 for engaging the clutch 18, and the forward brake actuator 93 will be bled of fluid to allow the brake 78 to be applied. Since the high pressure pump 85 is not operative due to the fact that the shaft 10 is stationary, the sump pump 86 is relied on to furnish the fluid pressure for engaging the second speed clutch 18. With no fluid pressure output from the high pressure pump 85, the piston 98 of the high pressure relief valve is in the position in which it is shown in Fig. 2 having its groove 104 connecting the grooves 101 and 102 in the valve casing 97. With the valve piston 98 in this position, the intake conduit 172 of the sump pump 86 is connected through the grooves 101, 102 and 104 with the conduit 176 leading to the oil supply tank 88, so with these conditions prevailing, the sump pump has access to the same supply of oil as does the high pressure pump under ordinary conditions. With the sump pump 86 being driven by the driven shaft, oil under pressure is discharged into the conduit 173 and is maintained at a certain predetermined pressure, less than the oil pressure in the oil conduit 171 when the high pressure pump is operative, by means of the low pressure relief valve 90. When the high pressure pump is inoperative, there is no fluid under pressure in the conduits 174 due to the high pressure pump, and the check valve 91 releases due to the fluid under pressure in the conduits 173, and fluid flows from the conduits 173 into the conduits 174. Fluid under pressure in the conduits 174 not only lubricates the planetary gear sets 14 and 15 but also supplies fluid under pressure to the second speed clutch piston 52. Fluid pressure in the conduits 174 flows through the grooves 144, 145 and 153 in the valve 96, with the valve being in its taxi-push position in which it is shown, through the conduit 184 to the piston 52, and the clutch 18 is thus engaged. The forward brake actuator 93 is bled through the conduit 185, the grooves 147, 148 and 154 in the valve 96, the conduit 181, the grooves 118, 119 and 125 in the valve 94, the conduit 182, the groove 122, the conduit 178, the groove 152, and the conduit 187. The forward brake 78 is thus engaged to complete a second speed power train from the driven shaft to the drive shaft. The reverse brake actuator 92 is bled through the conduit 186, the grooves 151 and 152 and the conduit 187, thereby maintaining the reverse brake disengaged. The low speed clutch piston 21 is not engaged due to the fact that there is no fluid pressure in the conduit 171 prior to a starting of the engine. It is contemplated that the piston 143 in the valve 96 shall be moved to its neutral position just as soon as the engine is started, and the transmission may then be shifted into any of its forward speed ratios or into reverse drive, as has been hereinabove described.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism, the combination of a drive shaft, a driven shaft, means for providing a plurality of power trains of different speed ratios between said shafts and including fluid pressure operated clutch mechanism and a gear set, casing means providing a fluid sump beneath said clutch mechanism and a fluid supply tank beneath said gear set, a pump driven by said drive shaft, a pump driven by said driven shaft, said drive shaft pump being connected to said tank as a fluid supply, and means for connecting said driven shaft pump with said sump as a fluid supply when said drive shaft pump is operative and with said tank as a fluid supply when said drive shaft pump is inoperative.

2. In transmission mechanism, the combination of a drive shaft, a driven shaft, means for providing a plurality of power trains of different speed ratios between said shafts and including fluid pressure operated clutch mechanism and a gear set, casing means providing a fluid sump beneath said clutch mechanism and a fluid supply tank beneath said gear set, a pump driven by said drive shaft, a pump driven by said driven shaft, said drive shaft pump being connected to said tank as a fluid supply, and means responsive to the output fluid pressure of said drive shaft pump for connecting said driven shaft pump with said sump as a fluid supply when said drive shaft pump is operative and with said tank as a fluid supply when said drive shaft pump is inoperative.

3. In transmission mechanism, the combination of a drive shaft, a driven shaft, means for providing a plurality of power trains of different speed ratios between said shafts and including fluid pressure operated clutch mechanism and a gear set, casing means providing a fluid sump beneath said clutch mechanism and a fluid supply tank beneath said gear set, a pump driven by said drive shaft, a pump driven by said driven shaft, said driven shaft pump being connected to said tank as a fluid supply, and means responsive to the output fluid pressure of said drive shaft pump and including a pressure responsive valve for connecting said driven shaft pump with said sump as a fluid supply when said drive shaft pump is operative and with said tank as a fluid supply when said drive shaft pump is inoperative.

4. In transmission mechanism, the combination of a drive shaft, a driven shaft, means for providing a plurality of power trains of different speed ratios between said shafts and including fluid pressure operated clutch mechanism and a gear set, casing means providing a fluid sump beneath said clutch mechanism and a fluid supply tank beneath said gear set, a pump driven by said driven shaft, said drive shaft pump being connected to said tank as a fluid supply and being connectible with said clutch mechanism for operating the clutch mechanism, and means for connecting said driven shaft pump with said sump as a fluid supply when said drive shaft pump is operative and for connecting the driven shaft pump with said tank as a fluid supply when said drive shaft pump is inoperative, said driven shaft pump being connectible with said clutch mechanism for operating the mechanism when said drive shaft pump is inoperative.

5. In transmission mechanism, the combination of a drive shaft, a driven shaft, means for providing a plurality of power trains of different speed ratios between said shafts and including fluid pressure operated clutch mechanism and a gear set, casing means providing a fluid sump beneath said clutch mechanism and a fluid supply tank beneath said gear set, a pump driven by said drive shaft, a pump driven by said driven shaft, said drive shaft pump being connected to said tank as a fluid supply and being connectible with said clutch mechanism for operating the mechanism, and means responsive to the output fluid pressure of said drive shaft pump for connecting said driven shaft pump with said sump as a fluid supply when said drive shaft pump is operative and for connecting the driven shaft pump with said tank as a fluid supply when said drive shaft pump is inoperative, said driven shaft pump being connectible with said clutch mechanism for operating the mechanism when said drive shaft pump is inoperative.

6. In transmission mechanism, the combination of a drive shaft, a driven shaft, means for providing a plurality of power trains of different speed ratios between said shafts and including fluid pressure operated clutch mechanism and a gear set, casing means providing a fluid sump beneath said clutch mechanism and a fluid supply tank beneath said gear set, a pump driven by said drive shaft, a pump driven by said driven shaft, said drive shaft pump being connected to said tank as a fluid supply and being connectible with said clutch mechanism for operating the mechanism, and means for connecting said driven shaft pump with said sump as a fluid supply when said drive shaft pump is operative and with said tank as a fluid supply when said drive shaft pump is inoperative and including a valve responsive to the output fluid pressure of said drive shaft pump, said driven shaft pump being connectible with said clutch mechanism for operating the mechanism when said drive shaft pump is inoperative.

7. In transmission mechanism, the combination of a drive shaft, a driven shaft, means for connecting said shafts in a plurality of different speed ratios and including a gear set and a pair of clutches for connecting the drive shaft with the gear set one for each of two different of said speed ratios, fluid pressure operable means and centrifugally operable means operable in accordance with the speed of the drive shaft jointly effective to engage one of said clutches, the other clutch being operable by fluid pressure alone, a fluid pump driven by said drive shaft and a fluid pump driven by said driven shaft, and means for selectively engaging said clutch engageable by fluid pressure alone by fluid pressure from said drive shaft pump or from said driven shaft pump when the drive shaft is not rotating.

8. In transmission mechanism, the combination of a drive shaft, a driven shaft, means for connecting said shafts in a plurality of speed ratios and including fluid pressure operated clutch mechanism and a gear set, said clutch mechanism including a fluid pressure operable clutch for connecting the drive shaft with the gear set, casing means providing a fluid sump beneath said clutch mechanism and a fluid supply tank beneath said gear set, a pump driven by said drive shaft, a pump driven by said driven shaft, means for selectively engaging said fluid operated clutch by fluid pressure from said drive shaft pump or from said driven shaft pump when the drive shaft is not rotating, and means for connecting said driven shaft pump with said sump as a fluid supply when said drive shaft pump is operative and with said tank as a fluid supply when said drive shaft pump is inoperative.

9. In transmission mechanism, the combination of a drive shaft, a driven shaft, means for connecting said shafts at a plurality of different speed ratios and including a gear set and fluid pressure operated clutch mechanism for connecting the gear set with the drive shaft, said clutch mechanism including a centrifugally controlled clutch operable according to the speed of said drive shaft and a second clutch operable by fluid pressure, casing means providing a fluid sump beneath said clutch mechanism and a fluid supply tank beneath said gear set, a pump driven by said drive shaft, a pump driven by said driven shaft, means for selectively engaging said fluid operated clutch by fluid pressure from said drive shaft pump or from said driven shaft pump when the drive shaft is not rotating, and means including a valve operated by fluid pressure from said drive shaft pump for connecting said driven shaft pump with said tank as a fluid supply when said drive shaft pump is inoperative.

10. In a transmission, the combination of a drive shaft, a driven shaft, and means for connecting said drive and driven shafts in a plurality of speed ratios and including a planetary gear set and a pair of clutches, said clutches each being adapted to connect an element of said gear set with said drive shaft and when both said clutches are engaged locking up said gear set and driving said driven shaft in a one-to-one drive from said drive shaft, one of said clutches being under the point control of means centrifugally operated according to the speed of said drive shaft and means operated by fluid pressure, said one clutch being engageable when both the centrifugal means and the fluid pressure operated means are operated and the other clutch being operated by fluid pressure alone.

11. In a transmission, the combination of a drive shaft, a driven shaft, and means for connecting said drive and driven shafts in a plurality of speed ratios and including a planetary gear set and a pair of clutches, said clutches each being adapted to connect an element of said gear set with said drive shaft and when both clutches are engaged locking up said gear set and driving said driven shaft in a one-to-one drive from said drive shaft, one of said clutches comprising centrifugal weights operated according to the speed of said drive shaft and a fluid pressure operated piston and being engageable only when both the piston and weights are operated and the other clutch including a fluid pressure operated piston and being operated thereby.

12. In a transmission, the combination of a drive shaft, a driven shaft, and means for connecting said drive and driven shafts in a plurality of speed ratios and including two planetary gear sets and a pair of clutches, each of said gear sets comprising sun, ring and planet gears and a planet gear carrier, one of said clutches being adapted to connect both of said sun gears with said drive shaft and the other of said clutches being adapted to connect one of said planet gear carriers with said drive shaft, one of said ring gears and the other of said planet gear carriers being connected with said driven shaft, and a brake for the other of said ring gears, one of said clutches being under the joint control of means centrifugally operated according to the speed of said drive shaft and means operated by fluid pressure, said one clutch being engageable when both the centrifugal means and the fluid pressure operated means are operated and the other of said clutches being operated by fluid pressure alone.

13. In a power transmission mechanism, the combination of a drive shaft, a driven shaft, means including gearing for providing a power train between said shafts, means providing a fluid sump for said gearing, a fluid pressure operated coupling unit interposed between said shafts and adapted to complete the power train between said shafts, means providing a fluid sump for said coupling unit, a pump for supplying fluid under pressure for operating said coupling unit and for lubricating said gearing, said pump being connected to draw fluid from said gearing sump and being driven by said drive shaft, a pump driven by an element of said gearing and being normally connected to maintain the coupling unit sump drained of fluid, and valve means for connecting said second-named pump to draw fluid out of said gearing sump and to supply fluid to said coupling unit for engaging the latter whereby said driven shaft may be driven to start an engine connected with said drive shaft.

14. In power transmission mechanism, the combination of a drive shaft, a driven shaft, means including gearing for providing a power train between said shafts, means providing a fluid sump for said gearing, a fluid pressure engaged clutch interposed between said shafts and adapted to complete the power train between said shafts, means providing a fluid sump for said clutch, a pump having its outlet connected to supply fluid under pressure to operate said clutch and to lubricate said gearing, said pump being connected to draw fluid from said gearing sump and being driven by said drive shaft, a pump driven by an element of said gearing, said last-named pump having its outlet connected with the outlet of said first-named pump and being normally connected to maintain the clutch sump drained of fluid, and valve means for connecting said second-named pump to draw fluid out of said gearing sump and to supply fluid to said clutch for engaging the latter whereby said driven shaft may be driven to start an engine connected with said drive shaft.

15. In a transmission, the combination of a drive shaft, a driven shaft, and means for connecting said drive and driven shafts in a plurality of speed ratios and including a planetary gear set and a pair of clutches, said clutches each being adapted to connect an element of said gear set with said drive shaft and when both clutches are engaged locking up said gear set and driving said driven shaft in a one-to-one drive from said drive shaft, one of said clutches comprising a centrifugal weight operated according to the speed of said drive shaft and a fluid pressure operated piston which are effective on the clutch, and the other clutch including a fluid pressure operated piston and being operated thereby.

DONALD W. KELBEL.

REFERENCES CITED

The following references are of record in the file of this patent:

UNITED STATES PATENTS

| Number | Name | Date |
|---|---|---|
| 731,470 | Pontois | June 23, 1903 |
| 953,992 | Fulberth | Apr. 5, 1910 |
| 1,619,701 | Chorlton | Mar. 1, 1927 |
| 1,818,910 | Sanine | Aug. 11, 1931 |
| 2,124,192 | Hanson | July 19, 1938 |
| 2,141,096 | Thurber | Dec. 20, 1938 |
| 2,160,385 | Kraemer | May 30, 1939 |
| 2,162,937 | Carter | June 20, 1939 |
| 2,183,761 | Aspinwall | Dec. 19, 1939 |
| 2,233,790 | Linsley | Mar. 4, 1941 |
| 2,251,625 | Hale | Aug. 5, 1941 |
| 2,332,593 | Nutt et al. | Oct. 26, 1943 |
| 2,406,225 | Kelbel | Aug. 20, 1946 |
| 2,407,289 | LaBrie | Sept. 10, 1946 |